United States Patent [19]

Williams et al.

[11] 3,744,253
[45] July 10, 1973

[54] OIL SPILL BOOM

[75] Inventors: Patrick Yelverton Williams; Kerry Charles Williams, both of Castlecrag, N. S. W.; Charles Edward Heath, Caringbah, N. S. W., all of Australia

[73] Assignee: Stamford Australia Pty. Ltd., New South Wales, Australia

[22] Filed: Mar. 20, 1972

[21] Appl. No.: 235,901

[30] Foreign Application Priority Data
Mar. 29, 1971 Australia................................ 4444

[52] U.S. Cl................................................ 61/1 F
[51] Int. Cl........................ E026 15/04, B636 35/00
[58] Field of Search.................... 61/1 F, 5; 210/242; 114/.5 F

[56] References Cited
UNITED STATES PATENTS
3,667,235   6/1972   Preus et al............................ 61/1 F
3,685,296   8/1972   Bogosian.............................. 61/1 F FOREIGN PATENTS OR APPLICATIONS
2,009,655   2/1970   France................................. 61/1 F Primary Examiner—Jacob Shapiro
Attorney—Sandoe, Hopgood & Calimafde

[57] ABSTRACT

An oil spill boom to restrain the passage past the boom of oil spilt onto water. The boom comprises a plurality of alignable interconnectable floats, a continuous screen barrier extending through, between, above and below the floats with the part below the floats formed of two walls spread apart at the bottom to provide an open bottom water ballast chamber, props and stays to support the screen barrier erected.

4 Claims, 5 Drawing Figures

PATENTED JUL 10 1973  3,744,253

OIL SPILL BOOM

This invention relates to an oil spill boom for use to restrain the passage past the boom of oil which has been spilt onto water.

It is important that the boom be effective under conditions of wind, wave and current, but as constructed hitherto a boom has only been effective under substantially still conditions. Hitherto, booms have been formed from floats with an upwardly extending fin against which small waves will break, and a downwardly extending skirt which is weighted by ballast such as lead weights to provide some measure of stability. However, current impinging against one side of the skirt will cause the boom to heel over thereby providing an inclined plane extending generally downstream whereby oil carried on the surface of water on the upstream side of the boom can flow under the boom. Furthermore, wind will impinge upon the upwardly extending fin and similarly cause the boom to heel.

The present invention has been devised to provide an oil spill boom (hereinafter referred to as "boom") wherein the disadvantages inherent in such booms of the prior art are overcome or substantially minimised and a boom which has improved manoeuvreability.

Basically the boom comprises a plurality of alignable interconnectable floats, a continuous screen barrier extending through, between, above and below the floats with the part below the floats formed of two walls spread apart at the bottom to provide an open bottom water ballast chamber, props and stays to support the screen barrier erected.

One embodiment of the invention is described with reference to the annexed drawings wherein.

Figure 1:
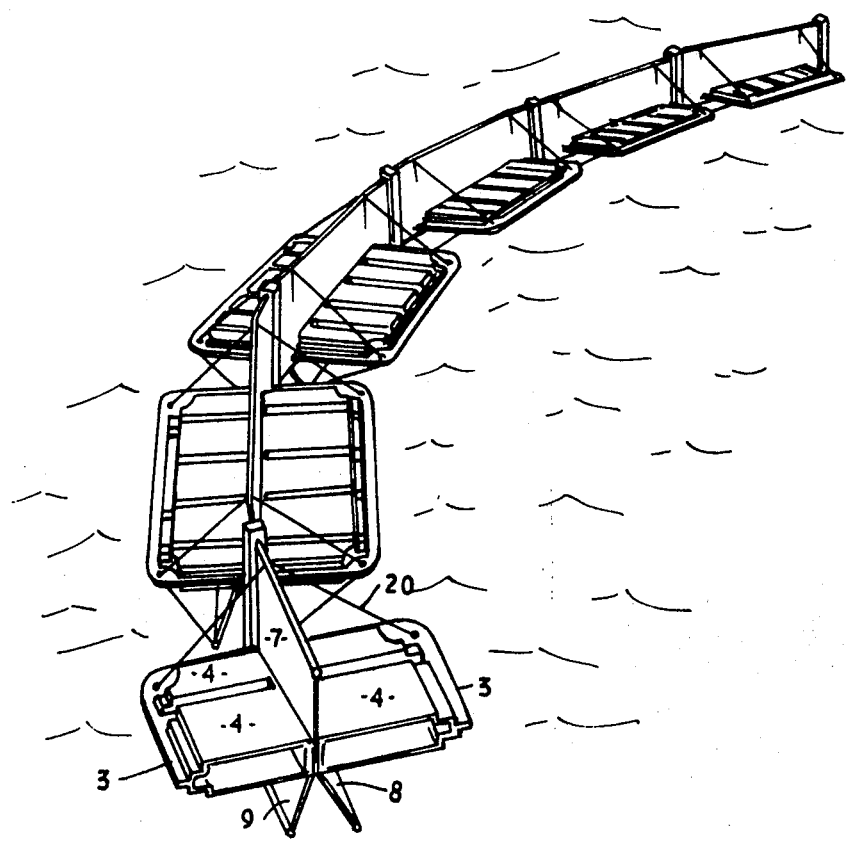
FIG. 1 is a perspective view of a boom in operative position, the leading float being partly in section, the tow skee being omitted.
Figure 3:
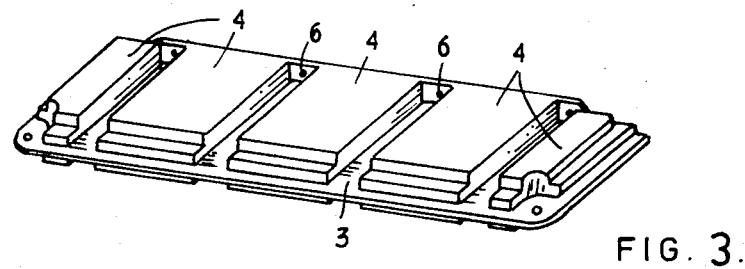
FIG. 3 is a perspective view of one half part of a float.
Figure 2:
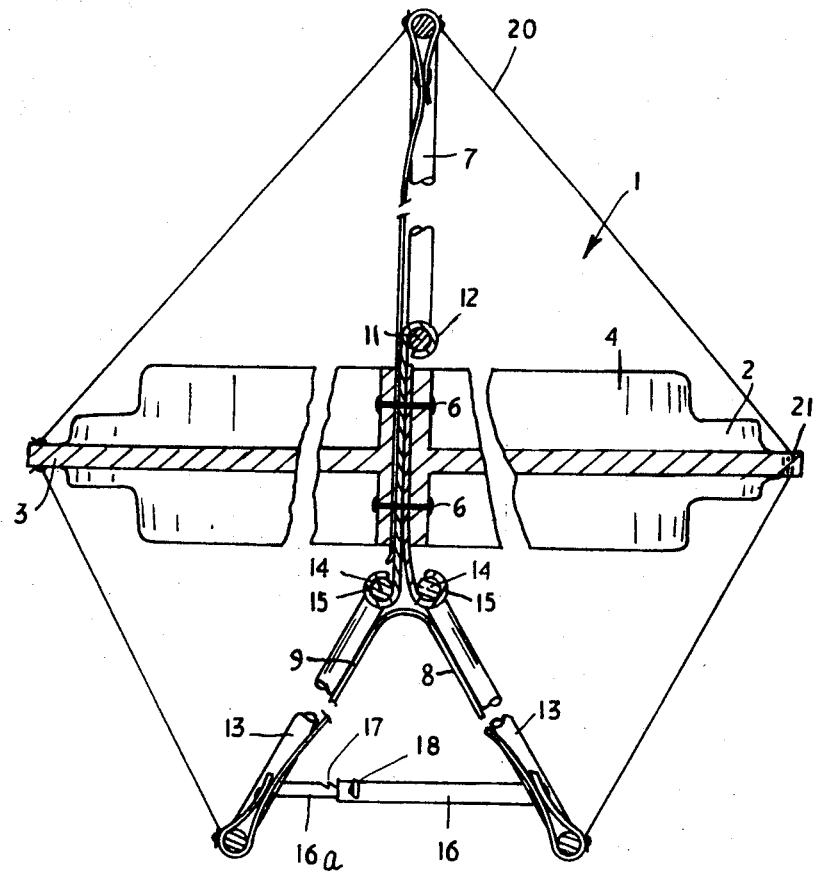
FIG. 2 is a cross sectional end view of a float assembly.
Figure 4:
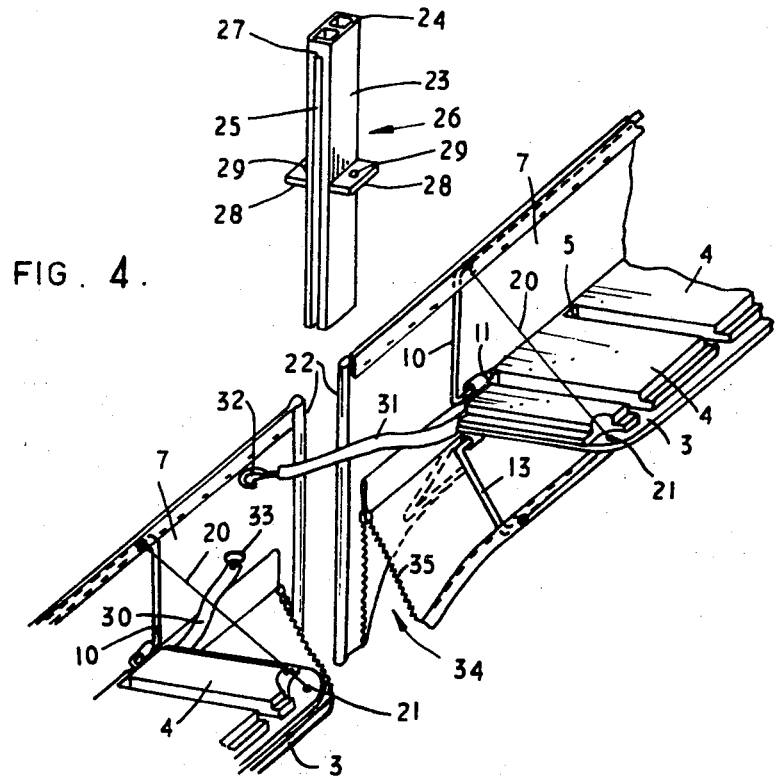
FIG. 4 is a fragmentary perspective view of two floats and the coupling member.
Figure 5:
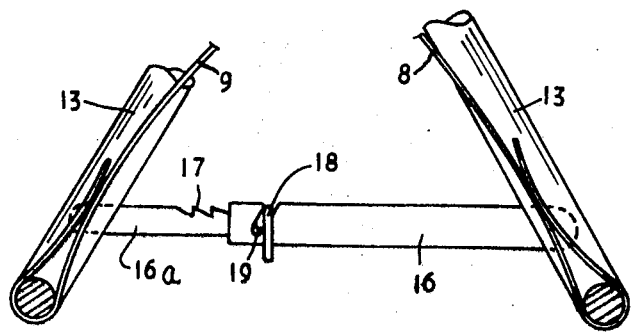
FIG. 5 is a fragment of the walls on line 5 — 5 of FIG. 4 showing a wall spreader strut.

Each float 1 is divided longitudinally into two equal parts 2 and 3 each incorporating buoyancy chambers 4 and on the inner edge coamings 5 whereby the two parts are joined together by rivets 6 after the screen barrier is inserted between the parts.

The screen barrier is made of impervious flexible sheet. It comprises a top fin 7 and two integral bottom walls 8 and 9. It is secured between the float parts 2 and 3 juxtaposed the bottom walls 8 and 9 by the rivets 6.

The fin 7 is held extended by a "U" prop 10 having the bend of the "U" approximately the length of a float 1 and the ends of the limbs turned inwardly as at 11 and secured adjacent the coamings 5 by socket brackets 12.

The bottom walls 8 and 9 are each held extended by "U" props 13 having the bend of each "U," approximately the length of a float 1, the ends of the limbs turned inwardly as at 14 and secured against the coamings by socket brackets 15. The walls 8 and 9 are held at an angle of one another by a strut 16 pivoted by its respective ends to opposed limbs of the "U" props 13. Each end of the walls may be supported in the same manner. Preferably the strut or struts are extensible or retractable. For this purpose the strut(s) is/are made in two parts 16 and 16a. Part 16a is slidable in part 16. It has catch teeth 17 on one edge adapted to be selectively engaged by a ring catch 18 on the part 16 through a slot 19 in such part.

The fin 7 and the bottom walls 8 – 9 are held erected by wire stays 20 at the respective ends of the float 1. The stays anchored to the respective ends of one prop 13 are rove through grommets 21 in the outer ends of the float 1, through the prop 10 and secured to the other prop 13 in a manner whereby they can be released to permit the fin 7 and the walls 8 and 9 to be collapsed onto the float 1 for stowage or transport.

The ends of the fin 7 and the walls 8 and 9 project beyond the float 1 a sufficient distance to permit maneuvreability of a boom. The respective ends of the walls are joined together about a post 22 and the end of the fin is also joined to the post. The fins and walls of one float assembly are coupled to adjoining assemblies by coupling members each comprising a longitudinal casing 23 conveniently rectangular having a medial wall 24 and opposed longitudinal slots 25 and 26 which are open at the bottom and closed at the top as at 27. A coupling member is slid over the conjoined ends of a fin and walls embracing a post 22 until the top end of a fin abuts the closed top 27. The coupling may incorporate brackets 28 having holes 29 therein to secure an anchor point.

A number of conjoined float assemblies are connected together in line to constitute a boom by straps 30 and 31 having respectively male and female catches 32 and 33 thereon.

The walls 8 or 9 may have in one of the projecting parts at both ends an opening flap 34 adapted to to closed by a sliding clasp fastener 35. The flaps are to facilitate collapsing the walls for stowage or transport.

When a boom is to be towed a conventional water skee (not shown) having a two rope is coupled to the fore end.

When the boom is subjected to the forces of wind and/or wave and/or current particularly athwart the structure the open bottom ballast chambers formed by the several walls 8 and 9 and the water therein constitutes a restraining force against any tendency of the boom to heel or lift.

In each float assembly the relative angular relationship between the walls and the underface of the float is such that heeling action, due to relative movement of water, acting on the walls creates counteracting forces to the float buoyancy to maintain the boom stable. It is presently preferred to space the walls apart at 60°.

We claim:

1. An oil spill boom comprising a plurality of alignable interconnectable floats wherein each float is divided longitudinally into two equal parts, each incorporating buoyancy chambers and on the inner edge coamings whereby the two parts are joined together, a continuous screen barrier made of impervious flexible sheet extending through, between, above and below the floats and comprising a top fin held extended by a "U" prop having the bend of the "U" approximately the length of a float, the bottom walls held extended to provide an open bottom water ballast chamber by "U" props having the bend of each "U" approximately the length of a float and the walls held at an angle to one another by a strut, all said "U" props being pivotally mounted on a float, the fin and the bottom walls being held erected by stays.

2. An oil spill boom screen barrier as claimed in claim 1, wherein the ends of the fin and the ends of the walls project beyond a float a sufficient distance to permit manoeuvreability of a boom and the respective ends are joined together about a post, the fins and walls of one float assembly being coupled to adjoining assemblies by coupling members embracing the respective posts.

3. An oil spill boom screen barrier as claimed in claim 2, wherein the coupling members each comprise a longitudinal casing having a medial wall and opposed longitudinal slots in the outer wall which are open at the bottom and closed at the top and is slid over the conjoined ends of a fin and walls embracing the post therein until the top end of the fin abuts the closed top.

4. An oil spill boom as claimed in claim 3 wherein a number of conjoined float assemblies are connected together to constitute a boom by straps secured on each float having respectively male and female catches thereon.

* * * * *